US009722525B2

(12) United States Patent
Vanko et al.

(10) Patent No.: US 9,722,525 B2
(45) Date of Patent: Aug. 1, 2017

(54) PROTECTIVE REDUNDANT SUBSYSTEM FOR POWER TOOLS

(71) Applicant: Black & Decker Inc., Newark, DE (US)

(72) Inventors: John C. Vanko, Timonium, MD (US); Larrry T. Albert, Abingdon, MD (US); Michael K. Forster, White Hall, MD (US); Bhanuprasad V. Gorti, Perry Hall, MD (US); Jason K. Leh, Rosedale, MD (US); Garrett P. McCormick, Manchester, MD (US); Samuel G. Woods, Bel Air, MD (US); David R. Beers, Dallastown, PA (US)

(73) Assignee: Black & Decker Inc., New Britain, CT (US)

( * ) Notice: Subject to any disclaimer, the term of this patent is extended or adjusted under 35 U.S.C. 154(b) by 23 days.

(21) Appl. No.: 14/744,599

(22) Filed: Jun. 19, 2015

(65) Prior Publication Data

US 2015/0288250 A1 Oct. 8, 2015

Related U.S. Application Data

(63) Continuation of application No. 12/875,504, filed on Sep. 3, 2010, now Pat. No. 9,071,188.

(Continued)

(51) Int. Cl.
*H02H 7/08* (2006.01)
*H02K 7/14* (2006.01)
(Continued)

(52) U.S. Cl.
CPC .............. *H02P 25/145* (2013.01); *B25F 5/00* (2013.01); *H02H 3/023* (2013.01); *H02H 3/247* (2013.01);
(Continued)

(58) Field of Classification Search
CPC .......... H02H 7/09; H02H 7/0833; H01H 9/52; H01H 9/061; H02P 29/02
(Continued)

(56) References Cited

U.S. PATENT DOCUMENTS

| 3,957,329 A | * | 5/1976 | McConnell | ............ H02H 9/028 361/104 |
| 4,040,117 A | * | 8/1977 | Houser | ................ H02H 7/0854 361/100 |

(Continued)

FOREIGN PATENT DOCUMENTS

| DE | 3119794 | 12/1982 |
| DE | 3432845 | 3/1986 |
| DE | 4021559 | 12/1991 |

*Primary Examiner* — Bentsu Ro
*Assistant Examiner* — Gabriel Agared
(74) *Attorney, Agent, or Firm* — Amir R. Rohanl (57) ABSTRACT

A protective redundancy circuit is provided for a power tool having an electric motor. The protective redundant subsystem is comprised of: a motor switch coupled in series with the motor; a motor control module that controls the switching operation of the motor switch; and a protective control module that monitors switching operation of the motor switch and disables the power tool when the switching operation of the motor switch fails. In the context of an AC powered tool, the switching operation of the motor switch is correlated to and synchronized to the waveform of the AC input signal. During each cycle or half cycle, the motor control module introduces a delay period before closing the motor switch and the protective control module determines the operational status of the motor switch by measuring the voltage across the motor switch during the delay period.

20 Claims, 7 Drawing Sheets

Related U.S. Application Data (60) Provisional application No. 61/239,959, filed on Sep. 4, 2009.

(51) Int. Cl.
  | | |
  |---|---|
  | *H02P 5/00* | (2016.01) |
  | *H02P 27/04* | (2016.01) |
  | *H02P 25/14* | (2006.01) |
  | *B25F 5/00* | (2006.01) |
  | *H02H 3/02* | (2006.01) |
  | *H02P 7/00* | (2016.01) |
  | *H02P 3/22* | (2006.01) |
  | *H02H 3/247* | (2006.01) |
  | *H02P 23/26* | (2016.01) |
  | *H02P 29/10* | (2016.01) |
  | *H02H 7/093* | (2006.01) |

(52) U.S. Cl.
  CPC ........... *H02H 7/0827* (2013.01); *H02K 7/145* (2013.01); *H02P 3/22* (2013.01); *H02P 7/00* (2013.01); *H02P 23/26* (2016.02); *H02P 29/10* (2016.02); *H02H 7/093* (2013.01)

(58) Field of Classification Search
  USPC ................. 361/33; 318/17, 280, 446, 800
  See application file for complete search history.

(56) References Cited

U.S. PATENT DOCUMENTS

| | | | |
|---|---|---|---|
| 5,650,728 A * | 7/1997 | Rhein | G01R 31/021 324/534 |
| 7,071,645 B2 | 7/2006 | Hahn et al. | |
| 7,427,842 B2 | 9/2008 | Kress et al. | |
| 7,551,411 B2 | 6/2009 | Woods et al. | |
| 7,551,441 B2 | 6/2009 | Cohen | |
| 7,817,384 B2 * | 10/2010 | Woods | B24B 23/028 318/432 |
| 7,861,796 B2 * | 1/2011 | DeCicco | B25B 21/00 173/1 |
| 8,286,723 B2 * | 10/2012 | Puzio | B25B 23/0064 173/1 |
| 2007/0093928 A1 * | 4/2007 | Forster | H02K 11/33 700/168 |
| 2009/0224703 A1 * | 9/2009 | Woods | B24B 23/028 318/17 |

\* cited by examiner

PROTECTIVE REDUNDANT SUBSYSTEM FOR POWER TOOLS

CROSS-REFERENCE TO RELATED APPLICATIONS

This application is a continuation of U.S. Non-Provisional application Ser. No. 12/875,504, filed on Sep. 3, 2010, which claims the benefit of U.S. Provisional Application No. 61/239,959, filed on Sep. 4, 2009. The entire disclosure of the above application is incorporated herein by reference.

FIELD

The present disclosure relates to power tools and, more particularly, to a protective redundant subsystem for power tools.

BACKGROUND

Phase control is one commonly employed method for controlling the voltage applied to a motor in a power tool. Motor operation is controlled by switching the motor current on and off at periodic intervals that are synchronized with the alternating current (AC) input signal. The switching operation is achieved through the use of an electronic switch, such as a triac, coupled in series with the motor. One potential concern for phase-controlled power tools is that the triac can fail. Failure of the triac can be melting, fusing, or cessation of commutating off, either permanently or temporarily. This concern is relatively small for power tools having mechanical power switches that enable the tool operator to turn off the motor even if the triac were to fail. However, this concern poses a greater concern as tool manufacturers look to replace the power switches with switches that do not conduct the power being delivered to the motor.

Many power tools also implement a "no-volt release" feature. Briefly, a no-volt release feature prevents a power tool from operating when it is plugged into an AC power outlet when the power switch is in an ON position (i.e., closed). In a typical implementation, the no-volt release feature will not prevent the tool from operating if the triac short circuits, thereby causing inadvertent tool operation. Therefore, it is desirable to provide a protective redundant subsystem that monitors the switching operation of a triac in a power tool application.

This section provides background information related to the present disclosure which is not necessarily prior art.

SUMMARY

A protective redundant system is provided for a power tool having an electric motor. The protective redundant system is comprised of: a motor switch coupled in series with the motor; a motor control module that controls the switching operation of the motor switch; and a protective control module that monitors switching operation of the motor switch and disables the power tool when the switching operation of the motor switch fails. In the context of an AC powered tool, the switching operation of the motor switch is correlated to and synchronized to the waveform of the AC input signal. During each cycle or half cycle, the motor control module introduces a delay period before closing the motor switch and the protective control module determines the operational status of the motor switch by measuring the voltage across the motor switch during the delay period.

In one aspect of the subsystem, the protective control module measures voltage across the motor switch when the phase of the AC input signal is less than a predetermined phase.

In another aspect of the protective redundancy circuit, a protective switch is connected across an AC line carrying the AC input signal and a fuse is disposed in the AC line, where the protective control module closes the switch when the measured voltage indicates a malfunction, thereby shorting the AC line and opening the fuse. Alternatively, the protective switch may be connected across the motor, where the protective control module closes the switch when the measured voltage indicates a malfunction, thereby shorting the AC line and opening the fuse.

The protective redundant system may further comprise a power on/off switch disposed between an AC power source and the motor, wherein the protective control module is operational only when the power on/off switch is in a closed position. Alternatively, the power on/off switch is disposed between an AC power source and the motor, wherein the protective control module receives an input indicative of position of the power on/off switch and operates in accordance with the input. In another instance, the power on/off switch is interfaced with the motor control module but does not conduct the power delivered to the motor therethrough, wherein the protective control module receives an input indicative of position of the power on/off switch and operates in accordance with the input.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
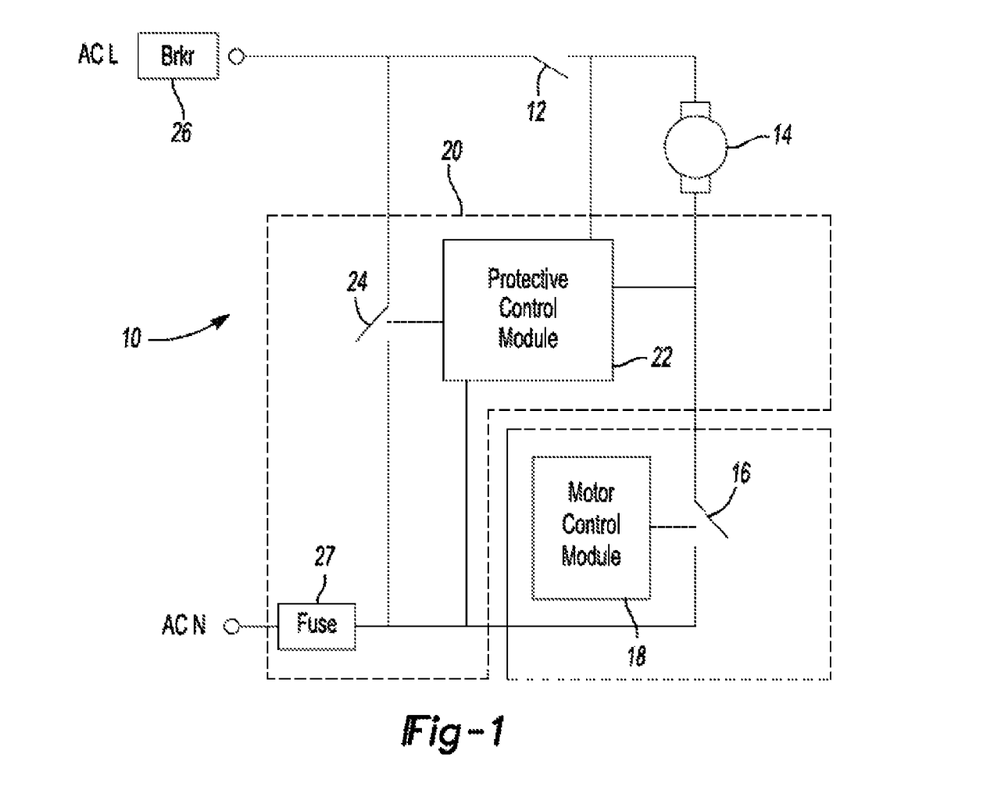
FIG. 1 is a simplified circuit diagram controlling a motor of a power tool.

FIG. 1 depicts a simplified circuit diagram for controlling a motor in a power tool. The motor control system 10 is comprised generally of a power on/off switch 12, an electric motor 14, a motor switch 16 coupled in series with the motor 14, and a motor control module 18 interfaced with the motor switch 16. In an exemplary embodiment, the motor is a universal motor and the motor switch is triac but it is readily understood that other types of motors and switches fall within the scope of this disclosure. For example, the motor may be an AC motor or DC motor, including brushed or brushless; whereas, the motor switch may be a field effect transistor (FET), an insulated gate bipolar transistor (IGBT), a silicon-controlled rectifier (SCR), or another type of electronic switch. The motor switch may also be replaced with an H-bridge, half-bridge or some other motor switching arrangement. In some embodiments, the motor switch may be incorporated into the motor control module. The motor control system is connectable to a power source. In the exemplary embodiment, the motor control system is connectable to an AC power source at AC main node and AC neutral node. The connection may be made in a conventional manner via a power cord to an AC outlet. However, it is envisioned that the protective redundant subsystem further described below is applicable to power tools having DC power sources as well.

During operation, the motor control module 18 controls the amount of voltage applied to the motor 14 by controlling the switching operation of the motor switch 16. As used herein, the term module may refer to, be part of, or include an electronic circuit, an Application Specific Integrated Circuit (ASIC), a processor (shared, dedicated, or group) and/or memory (shared, dedicated, or group) that execute one or more software or firmware programs, a combinational logic circuit, and/or other suitable components that provide the described functionality.

In an exemplary embodiment, the motor control module 18 employs phase control to control the amount of voltage applied to the motor 14. Generally, operation of the motor 14 is controlled by switching the motor current on and off at periodic intervals in relation to the zero crossing of the AC input signal. These periodic intervals are caused to occur in synchronism with the waveform of the AC signal and are measured in terms of a conduction angle, measured as a number of degrees. The conduction angle determines the point within the AC waveform at which the motor switch is fired (i.e., closed), thereby delivering current to the motor. For example, a conduction angle of 180° per half cycle corresponds to a condition of full or maximum conduction. That is, the motor switch 16 is fired such that current flows through the switch for the entire half cycle of the AC input signal. Similarly, a 90° conduction angle commences current flow in the middle of the half cycle and thus half the available energy is delivered to the motor. Thus, the conduction angle determines the point at which the motor switch is fired. While the following description is provided with reference to phase control, it is readily understood that other motor control schemes (e.g., pulse width modulation) are within the broader aspects of this disclosure.

The motor control system 10 further includes a protective redundant subsystem 20. The protective redundant subsystem 20 monitors the switching operation of the motor switch 16 and initiates one or more protective operations to protect the tool operator when the switching operation of the motor switch fails. Different arrangements for the protective redundant subsystem are contemplated as will be further described below.

With continued reference to FIG. 1, the protective redundant subsystem 20 may be comprised of a protective control module 22, a protective switch 24, and a circuit breaker 26 and/or fuse 27. In this exemplary embodiment, the protective control module 22 is configured to measure the voltage across the motor switch, as will be described later below.

In power tools with universal motors, current typically lags behind the voltage by a few degrees. This delay affects the operation of the triac. Specifically, the triac turns on by the motor control module and turns off at the current zero cross. Thus, it may be important not to turn the triac on too early in an AC voltage half cycle before it has had the opportunity to commutate off at the current zero cross ending the last current half cycle. Turning on the triac too early might result in a full half cycle of non-conduction, unless there is a provision for one or more re-firings of the triac within that half-cycle.

In order to ensure that the triac is not turned on too early, some delay is introduced between the AC voltage zero cross and the firing of the triac. The net effect is some delay from the true AC current zero cross until the triac can be fired in a maximum conduction situation. This small amount of electrical delay is introduced by the motor control module 18 and does not cause any major effect in the operation of the power tool (e.g., less than 0.01% RMS voltage is dropped across the triac).

Figure 2:
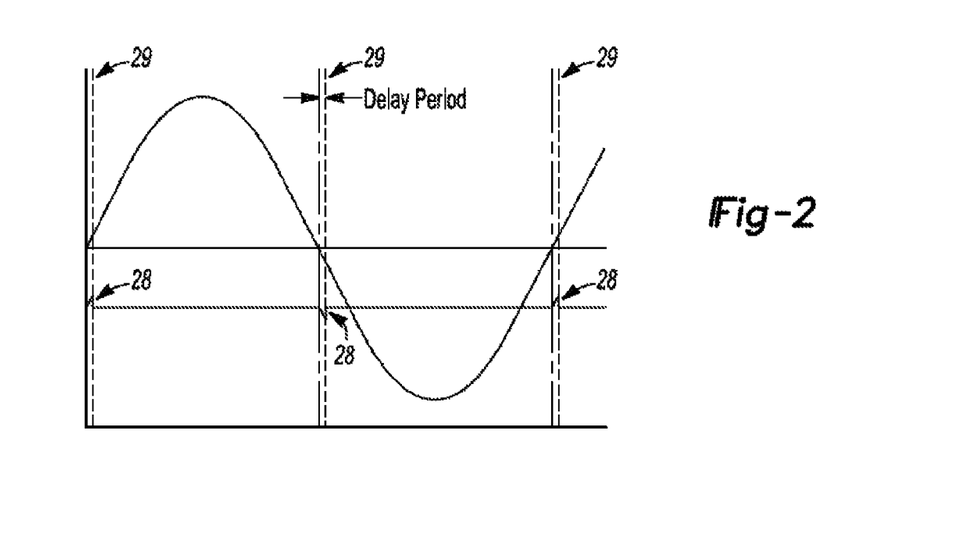
FIG. 2 illustrates the voltage across a phase-controlled switch in relation to the AC supply signal.

During this controlled delay, an instantaneous voltage develops across the triac following every voltage zero crossing. As shown in FIG. 2, the voltage spike 28 is developed across a phase-controlled switch in relation to the AC supply signal and has a saw-tooth shape. Specifically, the voltage spike appears immediately following the current zero crossing (not shown in FIG. 2) and ends when the triac is turned on. For example, on an exemplary 90 volt RMS AC supply, an instantaneous voltage of almost 11 volts will be developed across the triac before the device is turned on during normal phase-control operation. During maximum conduction, the motor control module 18 closes the triac after a short delay period (e.g., 5 degrees) from the voltage zero-crossing of the AC input signal as indicated at 29. Thus, the switching operation of the triac can be monitored by measuring the voltage across the triac during, for example, the first 5 degrees of non-conduction of every AC cycle (or half-cycle). It is understood that there is no need for the delay period when the prescribed conduction angle is less than maximum, i.e., when the firing point or closing of the triac exceeds the delay period (the firing point being the complement of the conduction angle such that a conduction angle of 135 degrees is a firing point of 45 degrees and a conduction of 60 degrees is a firing point of 120 degrees). In other words, the motor control module 18 may introduce a delay during every AC cycle (i.e., firing point angle+delay period angle) or only when the prescribed firing point is less than the delay period. Nonetheless, the protective control module 22 measures voltage across the triac preferably during the delay period (i.e., when the phase of the AC input signal is less than a phase signifying the delay period) but in any case during a non-conduction period of every AC cycle before the triac is closed.

Figure 3:
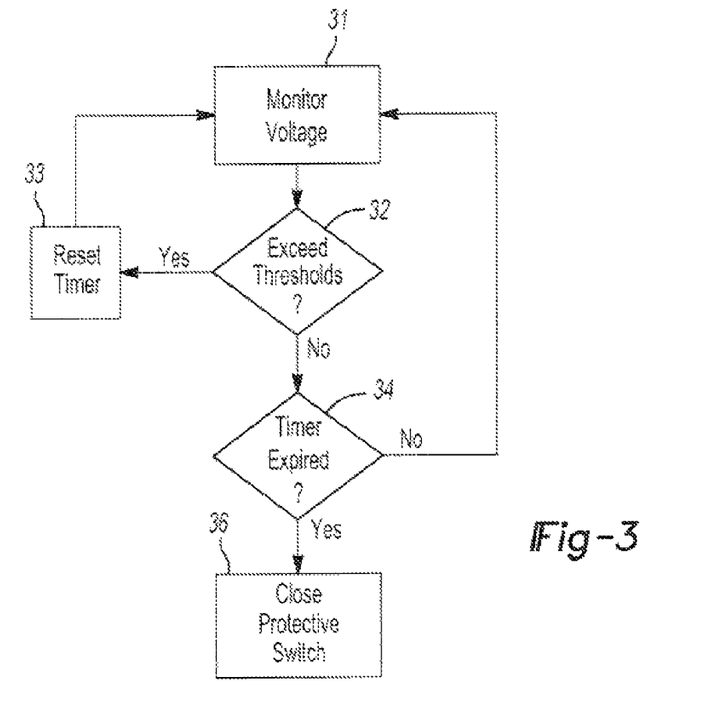
FIG. 3 is a flowchart illustrating the operation of an exemplary protective control module.

In an exemplary implementation, the protective control module 22 may function in the manner shown in FIG. 3. The protective control module will continually monitor the voltage across the triac as indicated at 31. The voltage is expected to develop across the switch during, for example, the first 4 or 5 degrees of non-conduction of every AC cycle. When the measured voltage exceeds some predetermined threshold (e.g., 7 volts), then the triac is operating properly. In this case, a timer is reset at 33 and voltage monitoring continues. However, when the measured voltage does not exceed the threshold during some expected time interval, then the triac is presumed to have failed (e.g., fused in a closed position) and the protective switch is closed at 36. The expected time interval and thus the timer duration are correlated to the length of the AC cycle and may be one AC half cycle, one full AC cycle, or any multiple of AC half cycles. In an exemplary embodiment, the above functionality may be implemented by software instructions embedded in a microprocessor. It is to be understood that only the relevant steps of the methodology are discussed in relation to FIG. 3, but that other software instructions, or other hardware, may be needed to control and manage the overall operation of the system. The above functionality may also be implemented by hard-wired electronic circuits as further described below.

When the measured voltage indicates the triac has failed, the protective control module 22 will initiate some protective operation to protect the user. Exemplary protective operations may include (but are not limited to) tripping a circuit breaker, blowing a fuse (including positive temperature coefficient resettable fuses), disabling the motor control scheme (e.g., phase control), disconnecting power to the motor (e.g., by opening a switch) or other otherwise disabling the operation of the power tool.

Referring back to FIG. 1, a protective switch 24 is connected across the AC line (i.e, coupled between the AC main line and the AC neutral or return line). In addition, a circuit breaker 26 and/or a fuse 27 is disposed in the circuit path between the AC power source and the protective switch. In this embodiment, the protective control module 22 closes the protective switch 24 when the triac 16 fails, thereby shorting the AC line. The sudden flow of current will trip the circuit breaker and/or blow the fuse, thereby disabling operation of the power tool. Protective switch may be implemented using a field effect transistor (FET), an insulated gate bipolar transistor (IGBT), a silicon-controlled rectifier (SCR), a triac, a solid-state relay, a mechanical relay or another type of switch.

Figure 11:
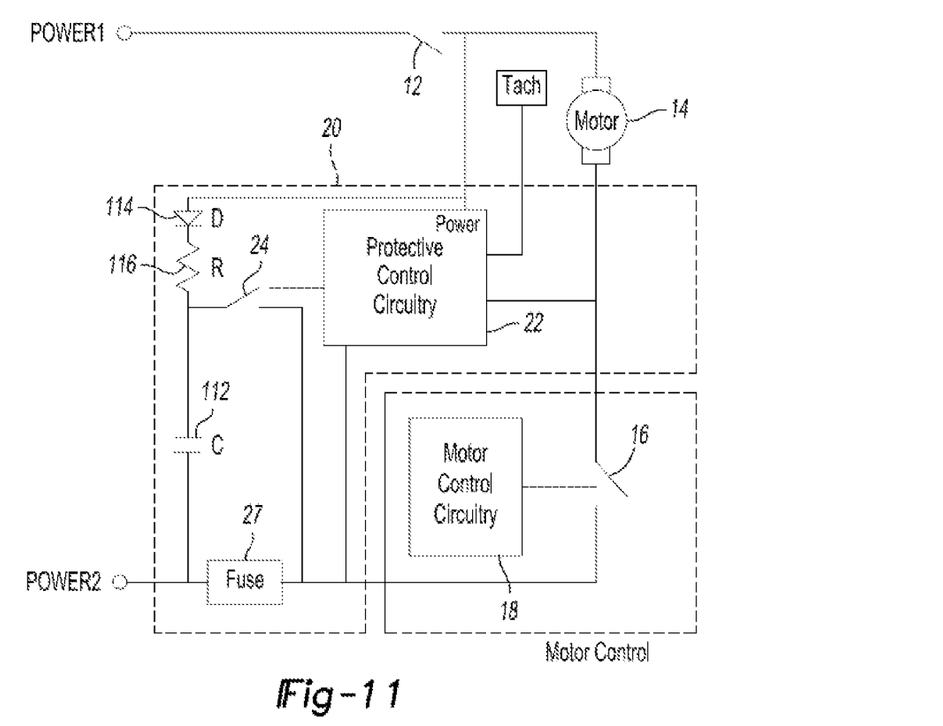
FIG. 11 is a diagram depicting an alternative embodiment of the protective redundant subsystem.

It is contemplated that there may be insufficient energy to blow the fuse or other protective device. An alternative embodiment for the protective redundant subsystem 20 is shown in FIG. 11. In this embodiment, a capacitor 112 is placed in parallel with the protective switch 24. During normal operation of the motor 14, the capacitor 112 is charged through a diode 114 and a resistor 116 that limits the inrush of current into the capacitor. When the protective control module 22 detects the triac has failed, it closes the protective switch 24. The energy stored in the capacitor 112 discharges into the fuse and thereby blows the fuse. It is envisioned that the capacitor 112 may be replaced with or used in combination with other types of energy storing devices, such as inductors. It is further understood that the protective redundant subsystem 20 may be reconfigured to support of such devices.

When the triac 16 fails, the operator cannot resume operation by merely replacing the fuse or resetting the circuit breaker. Therefore, it is contemplated that the protective redundant subsystem (or at least a portion thereof including the blown fuse and the failed motor switch) may be configured as a replaceable cartridge that can be replaced by the operator to resume tool operation. Other techniques for disabling the tool as well as other types of protective operations are contemplated by this disclosure.

In an alternative implementation, a temperature sensor may be used to determine the operational status of the triac. The temperature sensor may be placed proximate to the triac. When the temperature measure exceeds some threshold, it may likewise be presumed the triac has failed or is likely to fail. It is envisioned that other measures or combination of measures, like voltage and/or current, may be used to determine the operational status of the triac.

Figure 4:
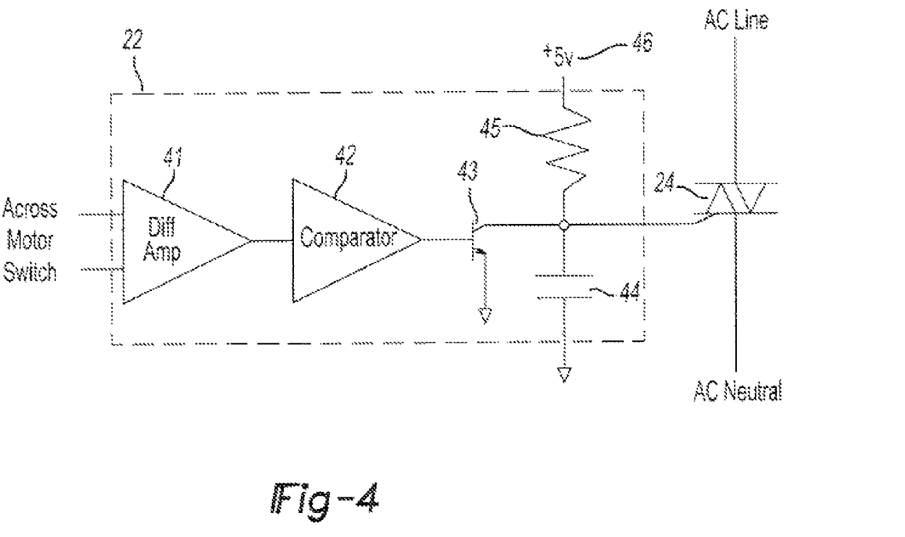
FIG. 4 is a circuit diagram of another exemplary embodiment of the protective control module.

FIG. 4 illustrates another exemplary embodiment of the protective control module 22. The protective control module 22 is comprised of a differential amplifier 41, a comparator 42, a transistor 43 and a capacitor 44. The differential amplifier 41 may be an operational amplifier; whereas, the comparator 42 may be an operational amplifier or an integrated circuit comparator.

Figure 6:
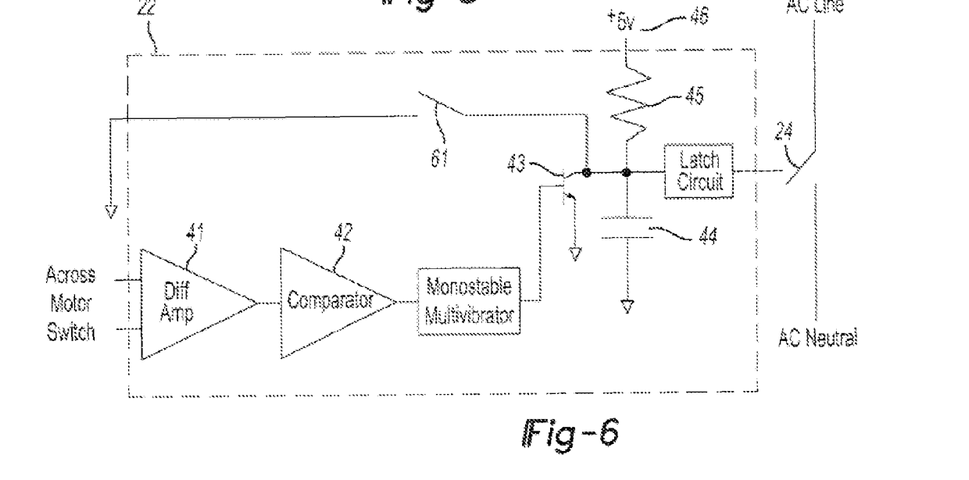
FIG. 6 is a circuit diagram of a variant of the protective control module which accounts for the state of the power on/off switch.
Figure 10:
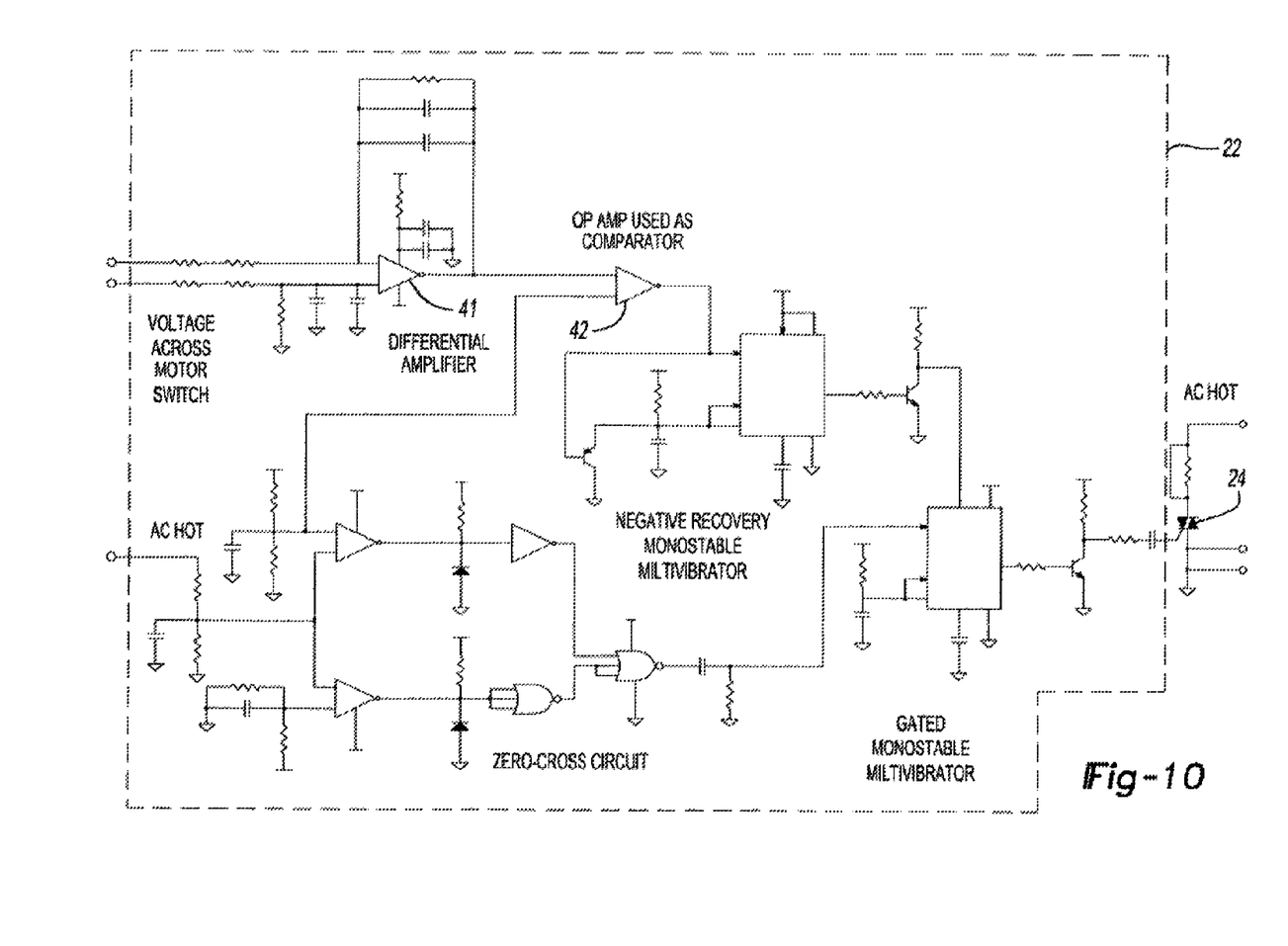
FIG. 10 is a circuit diagram of another variant of the protective control module.

In operation, the differential amplifier 41 senses the voltage across the motor switch (not shown). There will be some measureable voltage across the switch so long as the switch is not fused. The differential amplifier 41 acts to attenuate and low-pass filter the measured voltage, thereby discriminating against high frequency noise. Output from the differential amplifier 41 is in turn compared by the comparator 42 to a predefined voltage threshold. When the output from the differential amplifier 41 exceeds the voltage threshold, the comparator 42 outputs a signal to the transistor 43. The input signal to the transistor 43 causes the transistor to conduct, thereby shorting any charge that has accumulated on the capacitor to ground. A DC power supply 46 is continually charging the capacitor 44 through the resistor 45. Should the transistor 43 fail to short the charge on the capacitor 44, then the voltage across the capacitor will build to the point where the gate circuitry of the protective switch 24 (e.g., a triac; not all gate drive circuitry shown) fires and thereby shorts the AC line. This will occur when there is no measureable voltage across the switch 16 and thus comparator 42 does not output a signal to the transistor 43. In practice, it may be necessary to connect a monostable multivibrator to the output of the comparator in order to lengthen the time of short pulses which cause the transistor to conduct. The monostable multivibrator may be a negative recovery monostable multivibrator that is retriggerable. Furthermore, a latching circuit may be needed to ensure that once the triac fires it is not extinguished by subsequent AC phase reversals; an exemplary implementation of the multivibrator and the latching circuit are shown in FIG. 6. Furthermore, this latching circuit may repeatedly fire the protective switch 24 every AC half-cycle until the fuse opens or the circuit breaker blows. Such latching circuitry is shown in FIG. 10 as a zero cross detection circuit and a gated monostable multivibrator. It is noted that this embodiment does not protect against faults in the power on/off switch.

Figure 5:
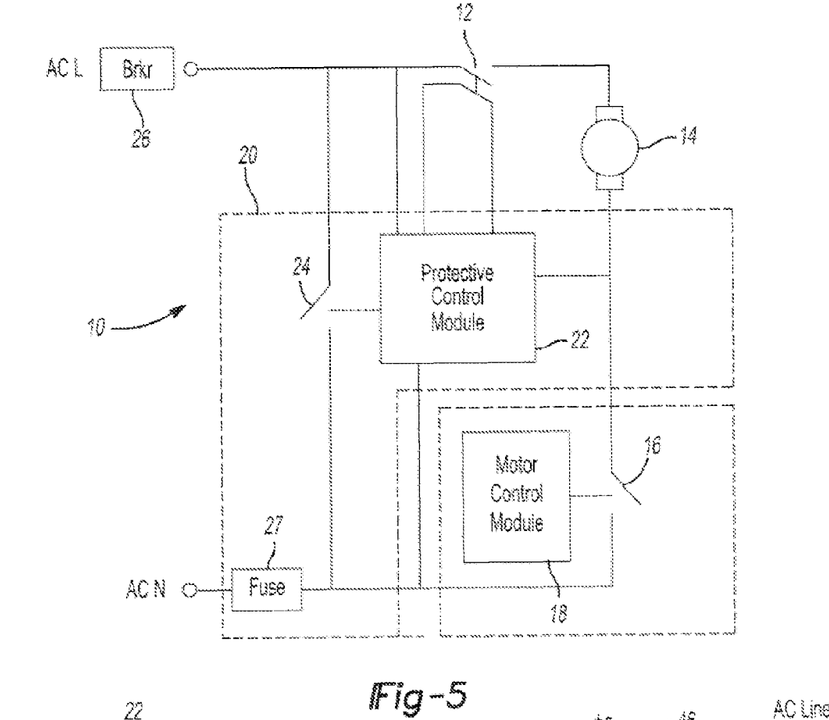
FIG. 5 is a circuit diagram of an alternative circuit arrangement for the motor control system.

FIG. 5 illustrates an alternative circuit arrangement for the motor control system. In this arrangement, the protective control module 22 can sense the position of the power on/off switch 12. To do so, the power on/off switch 12 may be implemented as a double pole switch having a second set of contacts which are used by the protective control module 22. Other techniques for determining the position of the power on/off switch are also envisioned.

FIG. 6 illustrates a variant of the protective control module 22 which accounts for the state of the power on/off switch and may be used in the arrangement shown in FIG. 5. When the power on/off switch 12 is in the on position (i.e., closed) and the motor switch 16 is fused, then the protective circuit 20 functions to short the AC line. When the power on/off switch 12 is in the off position (i.e., open), then there is no power through the motor 14 and thus no voltage across the motor switch 16. In the embodiment illustrated in FIG. 4, when there is no voltage across the motor switch 16 the protective circuit 20 would function to short the AC line. In the variant of the protective control module 22 illustrated in FIG. 6, when the power on/off switch is off, the alternate contact shown at 61 is closed. As a result, the capacitor 44 is shorted to ground and the AC line cannot be shorted while the power on/off switch is off.

Figure 7A:
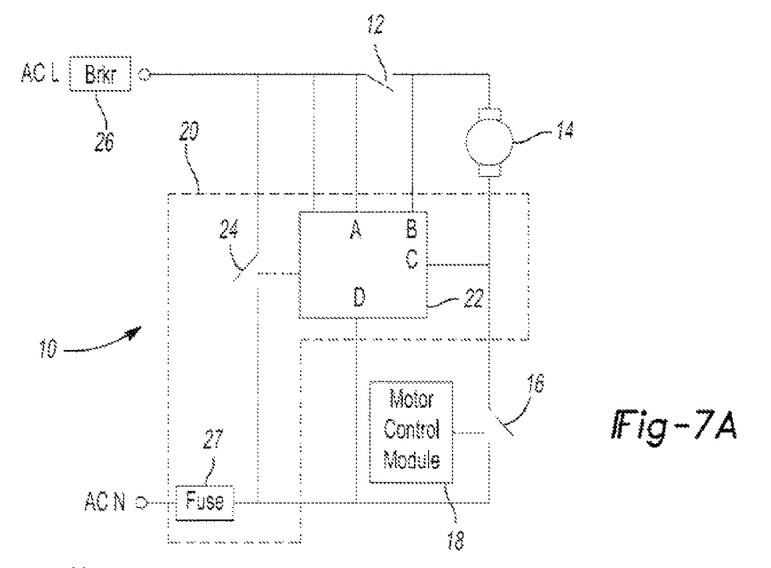
FIGS. 7A and 7B are circuit diagrams that illustrate another variant of the motor control system and the protective control module, respectively, which accounts for the state of the power on/off switch.

FIG. 7A illustrates another circuit arrangement for the motor control system which accounts for the state of the power on/off switch. The protective control module 22 illustrated in FIG. 7B further includes a second differential amplifier 71 and a second comparator 72 in place of the second pole of the double pole power on/off switch depicted in FIG. 5.

Figure 7B:
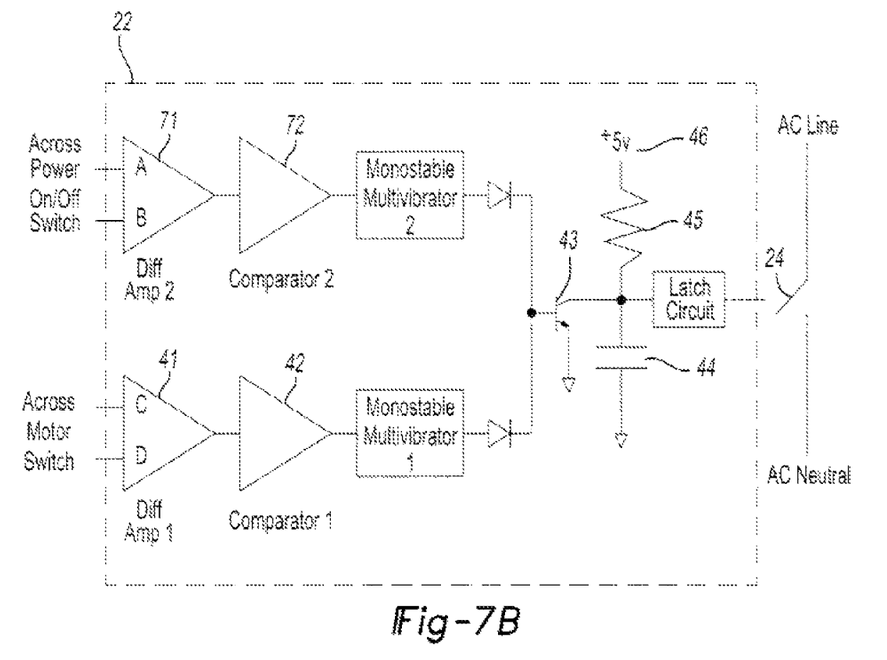

FIG. 7B illustrates a variant of the protective control module which may be used in the arrangement shown in FIG. 7A. The protective control module 22 in FIG. 7B is similar to the one depicted in FIG. 4 with similar components having the same reference numbers. With reference to FIG. 7B, there are two circuit paths which provide input to transistor 43. The protective switch 24 is closed only when the output from both paths is a logic low signal. On the other hand, if the output from either path is a high voltage signal, then the capacitor 44 is shorted to ground and the protective switch 24 remains open. For instance, when the power on/off switch 12 is in an ON position (i.e., closed), there is no voltage across the power on/off switch 12 and the output from the upper circuit path is a logic low signal. The output from the lower circuit path follows the explanation provided in reference to FIG. 4. That is, there will be some measureable voltage across the motor switch 16 so long as the motor switch is not fused. This signal will periodically cause the transistor to conduct, thereby shorting the capacitor to ground and keeping the protective switch 24 open. Should the motor switch short circuit, the output from the lower circuit path remains a logic low signal. As a result, there is no input signal to the transistor 43 and the subsequent build up of voltage across the capacitor will close the protective switch 24. When the power on/off switch 12 is in an OFF position (i.e., open), the output from the upper circuit path is a logic high signal. In this scenario, the capacitor is shorted to ground and the protective switch 24 remains open when the tool is not operational.

Figure 8:
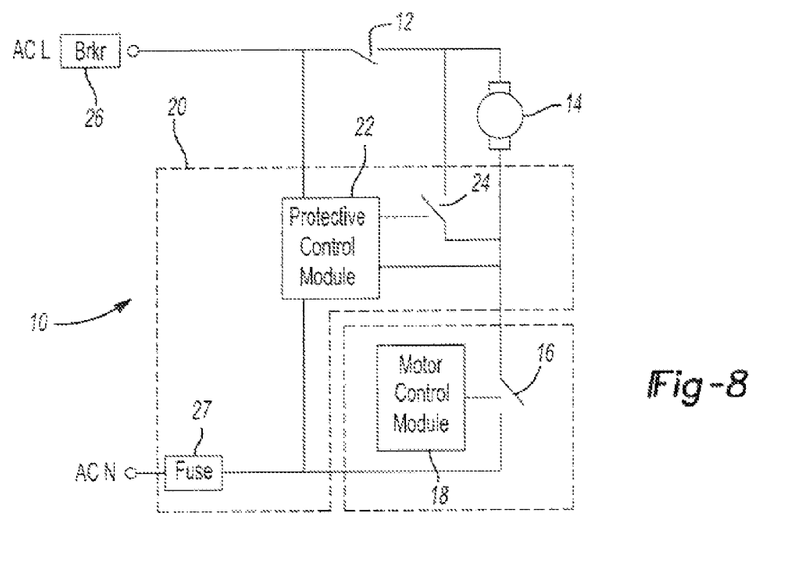
FIG. 8 is a circuit diagram for a motor control system having a protective switch across the motor.

FIG. 8 illustrates another alternative circuit arrangement for the motor control system. In this arrangement, the protective switch 24 is connected across the motor. This arrangement alleviates the need for sensing the state of the power on/off switch. When the power on/off switch is off (i.e., open position), there is no voltage across the motor switch so that the protective control module closes the protective switch. Any current shorted around the motor is not sufficient to trip the breaker or blow the fuse when the power on/off switch is in an off position. Conversely, when the power on/off switch is on (i.e., closed position), the protective control module 22 operates in the manner described above in relation to FIG. 1.

Figure 9:
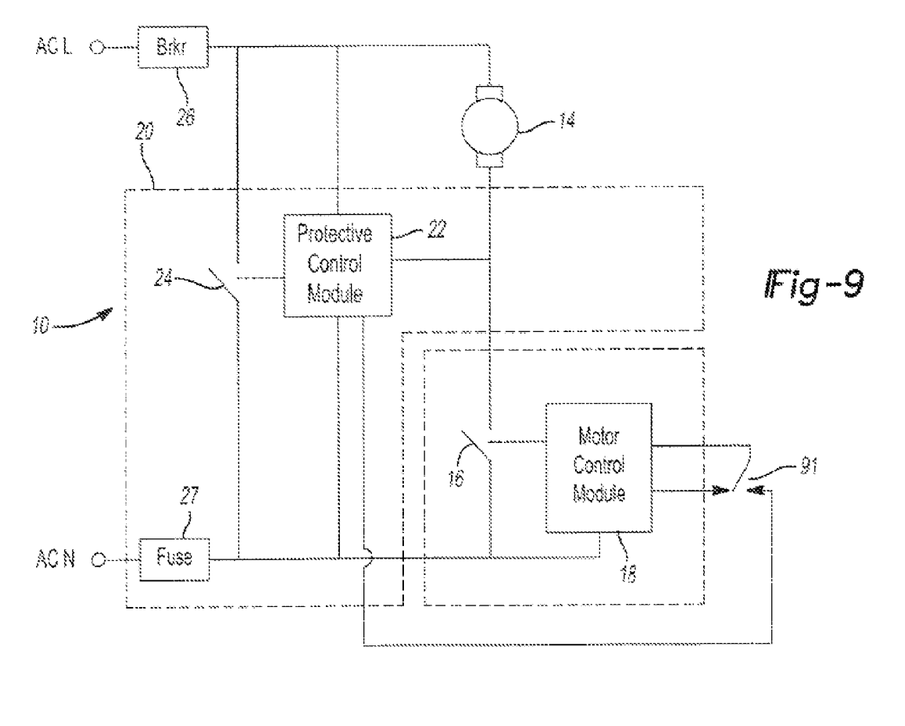
FIG. 9 is a circuit diagram for a motor control system having a power on/off switch that does not conduct the power delivered to the motor.

Preceding embodiments contemplate a power on/off switch that is disposed between the AC power source and the motor such that the power delivered to the motor is conducted through the power on/off switch. FIG. 9 illustrates an alternative embodiment of a protective redundant subsystem that is suitable for use with a power on/off switch that does not conduct the power delivered to the motor. In this exemplary embodiment, the power on/off switch 91 is interfaced with the motor control module 18 and provides an indicator thereto as to whether a user desires the tool to be operational or not. The motor control module 18 may in turn control the amount of voltage applied to the motor 14 in the manner described above. The power on/off switch 91 may be implemented as a push button, a sliding switch or some other type of "logic" switch. Rather than being connected across the AC line, it is also envisioned that the protective switch 24 may be connected across the motor 14.

The protective control module 22 can also sense the state or position of the power on/off switch 91. To do so, the power on/off switch 91 may be implemented as a double pole switch having a second set of contacts which are used by the protective control module 22. In this way, the protective control nodule 22 receives an input indicative of position of the power on/off switch 91 and operates in accordance with the input. During operation, the protective control module 22 will function to short the AC line in the manner described above when the power on/off switch 91 is in the on position (i.e., closed) and the motor switch 16 is short circuited. Likewise, the protective control module 22 is configured to short the AC line when the power on/off switch 91 is in the off position (i.e., open) but the motor switch 14 is fired by the motor control module 18. In this way, the protective control module 22 also serves to protect against a fault in the motor control module 18. This additional protective measure is particularly important since the power on/off switch 91 does not conduct the power delivered to the motor.

In an alternative embodiment of the protective control module 22 shown in FIG. 9, the protective control module 22 may disable monitoring of the motor switch when the power on/off switch is in the off position (i.e. open) and thus the tool is not operational. For this exemplary embodiment, the protective control module 22 may be implemented as shown in FIG. 6. Other techniques for determining the position of the power on/off switch as well as other implementations for the protective control module 22 are also envisioned by this disclosure.

Power tools incorporating the protective redundant subsystem described above may also be configured with a "no-volt release" function. If the power on/off switch is in the On position and the AC power is applied to the tool, the "no-volt release" function will prevent the tool from operating. Only upon opening the power on/off switch to the Off position and subsequently closing the on/off switch to the On position will the tool become operational. Thus, the "no-volt release" function may monitor the position of the power on/off switch. Alternatively, the "no-volt release" function may monitor power through the motor switch to infer whether the power on/off switch has been actuated to the Off position. Further details regarding an exemplary "no-volt release" function may be found in U.S. Pat. No. 7,551,411, which is incorporated herein by reference in its entirety.

In the event that the motor switch becomes shorted, the "no-volt release" function may not operate properly, especially when the power tool is configured with a power on/off switch that does not conduct the power being delivered to the motor. In this situation, the protective redundant subsystem works cooperatively with the "no-volt release" function to prevent unsafe operation of the tool. The "no-volt release" function is typically implemented by the motor control module. However the protective redundant subsystem and the "no-volt release" function may be combined into a single module. The protective redundant subsystem and the motor control subsystem may also be combined into one module.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention. Example embodiments are provided so that this disclosure will be thorough, and will fully convey the scope to those who are skilled in the art. Numerous specific details are set forth such as examples of specific components, devices and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A protective redundancy circuit for a power tool having an electric motor powered by an alternating current (AC) signal, comprising:
    a motor control module interfaced with a motor switch coupled in series with the motor to control the switching operation of the motor switch such that the switching operation of the motor switch is correlated to the waveform of the AC signal, the motor switch being operable to be closed by the motor control module within an AC half cycle and opened at a subsequent zero-crossing of the AC current, wherein, where motor control module is intended to operate the motor switch at full conduction, within each AC voltage half cycle, the motor control module introduces a delay period after a zero-crossing of the AC voltage half cycle and closes the motor switch after the end of the delay period to allow the motor switch to open at a current zero-crossing from a previous current half cycle within the delay period before the motor control module closes the motor switch; and
    a protective control module that measures the voltage across the motor switch during the delay period and before the motor control module closes the switch, and disables the power tool when the voltage across the motor switch during the delay period fails to meet a predetermined criterion.

2. The protective redundancy circuit of claim 1 wherein motor control module closes the motor switch at a predetermined phase of the AC signal that includes the delay period.

3. The protective redundancy circuit of claim 1 wherein the protective control module sustains operation of the power tool when voltage across the motor switch exceeds a threshold and disables the power tool when voltage across the motor switch is less than the threshold.

4. The protective redundancy circuit of claim 2 wherein the protective control module measures voltage across the motor switch when the phase of the AC input signal is less than a phase signifying the delay period.

5. The protective redundancy circuit of claim 1 further comprises a protective switch connected across an AC line carrying the AC input signal and a fuse disposed in the AC line, where the protective control module closes the switch when the measured voltage indicates a malfunction, thereby shorting the AC line and opening the fuse.

6. The protective redundancy circuit of claim 1 further comprises a protective switch connected across the motor and a fuse disposed in the AC line, where the protective control module closes the switch when the measured voltage indicates a malfunction, thereby shorting the AC line and opening the fuse.

7. The protective redundancy circuit of claim 1 further comprises a fuse disposed in the AC line, an energy storing device, and a protective switch in series with the energy storing device, wherein the energy storing device and the protective switch are arranged in parallel with the fuse to short the AC line and open the fuse when the measured voltage indicates a malfunction.

8. The protective redundancy circuit of claim 1 further comprises a power on/off switch disposed between an AC power source and the motor, wherein the protective control module is operational only when the power on/off switch is in a closed position.

9. The protective redundancy circuit of claim 1 further comprises a power on/off switch disposed between an AC power source and the motor, wherein the protective control module receives an input indicative of position of the power on/off switch and operates in accordance with the input.

10. The protective redundancy circuit of claim 1 further comprises a power on/off switch interfaced with the motor control module but does not conduct the power delivered to the motor therethrough, wherein the protective control module receives an input indicative of position of the power on/off switch and operates in accordance with the input.

11. A power tool configured to receive an alternating current (AC) input signal, comprising:
    an electric motor;
    a motor switch coupled in series with the motor;
    a motor control module interfaced with the motor switch to control the switching operation of the motor switch such that the switching operation of the motor switch is correlated to the waveform of the AC signal, the motor switch being operable to be closed by the motor control module within an AC half cycle and opened at a subsequent zero-crossing of the AC current, wherein, where motor control module is intended to operate the motor switch at full conduction, within each AC voltage half cycle, the motor control module introduces a delay period after a zero-crossing of the AC voltage half cycle and closes the motor switch after the end of the delay period to allow the motor switch to open at a current zero-crossing from a previous current half cycle within the delay period before the motor control module closes the motor switch;

a protective control module that measures the voltage across the motor switch during the delay period and before the motor control module closes the switch, and disables the power tool when the voltage across the motor switch during the delay period fails to meet a predetermined criterion.

12. The power tool of claim 11, further comprising a power switch configured to receive input indicative of a user desired operational state of the power tool but does not conduct the power delivered to the motor therethrough.

13. The power tool of claim 12, further comprising a no-volt release module interfaced with the power switch and the motor switch, wherein the no-volt release module monitors the position of the power switch and prevents the power tool from operating when the power switch is in an ON state before power is applied to the power tool.

14. The power tool of claim 11, wherein motor control module closes the motor switch at a predetermined phase of the AC signal that includes the delay period.

15. The power tool of claim 11, wherein the protective control module sustains operation of the power tool when voltage across the motor switch exceeds a threshold and disables the power tool when voltage across the motor switch is less than the threshold.

16. The power tool of claim 11, further comprising a protective switch connected across an AC line carrying the AC input signal and a fuse disposed in the AC line, where the protective control module closes the switch when the measured voltage indicates a malfunction, thereby shorting the AC line and opening the fuse.

17. The power tool of claim 11, further comprising a protective switch connected across the motor and a fuse disposed in the AC line, where the protective control module closes the switch when the measured voltage indicates a malfunction, thereby shorting the AC line and opening the fuse.

18. The power tool of claim 11, further comprising a fuse disposed in the AC line, an energy storing device, and a protective switch in series with the energy storing device, wherein the energy storing device and the protective switch are arranged in parallel with the fuse to short the AC line and open the fuse when the measured voltage indicates a malfunction.

19. The power tool of claim 11, further comprising a power on/off switch disposed between an AC power source and the motor, wherein the protective control module is operational only when the power on/off switch is in a closed position.

20. The power tool of claim 11, further comprising a power on/off switch disposed between an AC power source and the motor, wherein the protective control module receives an input indicative of position of the power on/off switch and operates in accordance with the input.

* * * * *